United States Patent
Chawla et al.

(10) Patent No.: US 10,140,455 B2
(45) Date of Patent: Nov. 27, 2018

(54) DISTRIBUTED SYSTEM FOR DISCOVERY OF VULNERABILITIES IN APPLICATIONS INCLUDING DETECTING AND/OR FILTERING OUT VULNERABILITY DUPLICATES

(71) Applicant: Synack, Inc., Redwood City, CA (US)

(72) Inventors: Kirti Chawla, Redwood City, CA (US); Mikhail Sosonkin, Redwood City, CA (US); Liam Norris, Redwood City, CA (US); Mark Kuhr, Redwood City, CA (US)

(73) Assignee: Synack, Inc., Redwood City, CA (US)

( * ) Notice: Subject to any disclaimer, the term of this patent is extended or adjusted under 35 U.S.C. 154(b) by 192 days.

(21) Appl. No.: 15/132,810

(22) Filed: Apr. 19, 2016

(65) Prior Publication Data
US 2017/0300698 A1 Oct. 19, 2017

(51) Int. Cl.
*G06F 21/57* (2013.01)
*G06F 17/30* (2006.01)
*H04L 29/06* (2006.01)

(52) U.S. Cl.
CPC ...... *G06F 21/577* (2013.01); *G06F 17/30864* (2013.01); *H04L 63/1433* (2013.01)

(58) Field of Classification Search
None
See application file for complete search history.

(56) References Cited

U.S. PATENT DOCUMENTS

| | | | | |
|---|---|---|---|---|
| 6,976,053 B1* | 12/2005 | Tripp | ................ | G06F 17/30864 707/999.102 |
| 8,762,334 B1* | 6/2014 | Ma | ...................... | H04L 63/1408 707/627 |
| 2001/0054153 A1* | 12/2001 | Wheeler | .................. | G06F 21/55 713/185 |
| 2002/0116402 A1* | 8/2002 | Luke | ................. | G06F 17/30067 |
| 2004/0003072 A1* | 1/2004 | Mathew | ............ | G06F 17/30867 709/223 |
| 2009/0292696 A1* | 11/2009 | Shuster | ............. | G06F 17/30867 |
| 2011/0218972 A1* | 9/2011 | Tofano | ............... | G06F 17/30159 707/692 |
| 2011/0231936 A1* | 9/2011 | Williams | .............. | G06F 21/577 726/25 |
| 2013/0204882 A1* | 8/2013 | Blaschak | ............ | G06F 17/3053 707/751 |
| 2013/0262082 A1* | 10/2013 | McKeeman | ............ | G06F 17/27 704/9 |

(Continued)

*Primary Examiner* — Malcolm Cribbs
(74) *Attorney, Agent, or Firm* — Davis Wright Tremaine ILP; Philip H. Albert

(57) ABSTRACT

A vulnerability report evaluation system comprises a preprocessor that takes as its input a data record representing a vulnerability report and outputs a search record. The vulnerability report evaluation system further comprises a search engine and a searchable corpus comprising records of vulnerabilities, wherein the search engine is configured to use the outputted search record to search the corpus. The vulnerability report evaluation system can flag search result hits resulting from the searched search record as an indication that the submitted vulnerability report is a duplicate of an earlier vulnerability report or as a flag to trigger manual review, while providing efficient processing of vulnerability report data records.

19 Claims, 6 Drawing Sheets

(56) References Cited

U.S. PATENT DOCUMENTS

| | | | |
|---|---|---|---|
| 2014/0081925 A1* | 3/2014 | Haeberle | G06F 17/30994 707/692 |
| 2014/0165204 A1* | 6/2014 | Williams | G06F 21/577 726/25 |
| 2015/0356134 A1* | 12/2015 | Hayasaka | G06F 3/0608 707/692 |
| 2017/0132186 A1* | 5/2017 | Plummer | G06F 17/2288 |
| 2017/0132242 A9* | 5/2017 | Gunda | G06F 17/30156 |
| 2017/0208093 A1* | 7/2017 | Williams | H04L 63/20 |
| 2017/0255693 A1* | 9/2017 | Trifunovic | G06F 17/30268 |
| 2017/0344579 A1* | 11/2017 | Basireddy | G06F 17/30097 |

* cited by examiner

| VULN # | URL | TIMESTAMP | TESTER ID | REPORT |
|---|---|---|---|---|
| 1 | example.com/index.html | 1401.1234 | T123 | The HTML code is modifiable here. |
| 2 | example.com/shop/main.html | 1405.1057 | T505 | Form fields can be altered externally. |
| 3 | second.example.com/chat/search.html | 1403.4555 | T675 | When I type "!" I get a shell command line |
| 4 | second.example.com/chat/search.html | 1403.4575 | T031 | Escape characters allow command line access |
| 5 | <domain>/shop/sitemap.html | 1403.4600 | T031 | HTTPS is not secure on this page |
| ... | ... | ... | ... | ... |

DISTRIBUTED SYSTEM FOR DISCOVERY OF VULNERABILITIES IN APPLICATIONS INCLUDING DETECTING AND/OR FILTERING OUT VULNERABILITY DUPLICATES

FIELD OF THE INVENTION

The present disclosure generally relates to testing of computers relating to security issues. The disclosure relates more particularly to techniques for performing security testing of computer systems using a distributed group of security testers and detecting and/or filtering out duplicate vulnerability reports related to those computer systems.

BACKGROUND

Performing security testing on a computer system might involve exercising parts of the functionality of the computer system and evaluating whether an instance of security vulnerability exists. For example, if a computer system is supposed to be accessible only to authorized persons and is supposed to block unauthorized persons, a simple test might be for a tester to access the computer system and at a login screen that asks for a user name and a password, type in a known invalid name, such as "nobody" and a known invalid password such as leaving the password field blank and then submitting that as a login. If the computer system responds by allowing the tester past the login screen as if the tester were an authorized person, that indicates that the computer system has a security vulnerability. If the computer system responds by displaying a message such as "Unrecognized user name or password" and remains at the login screen, that may indicate that the computer system might not have that particular vulnerability.

This is, of course, an extremely simple test and fully testing a computer system for moderate complexity of vulnerabilities can be quite involved. For example, a computer system might have a vulnerability that is only noticed if a tester inputs an unexpected string into a field, such as entering "; DROP TABLE users" into a field that is used to enter a user name. The computer system might have many different locations in an application that ask for user name and it might be that some of those correctly respond by refusing to process the improper input while others would process the improper input and perform actions that the designers of the computer system assumed would not be allowed to ordinary users.

A typical computer system might be executing a complex application, such as a web banking application that handles information display, transaction generation and funds transfers, an e-commerce application that handles product display, online shopping, purchasing and shipping, or other complex systems. With such systems, it can be useful to receive vulnerability reports from a great many of testers who might be operating independently of other testers. These testers might be security professionals testing a target computer system on behalf of a security company that provides compensation or rewards to testers who submit vulnerability reports.

One problem with providing compensation or rewards to testers who submit vulnerability reports is that the award is typically limited to the first submitter and multiple independent testers might report the same vulnerability. An evaluator might manually read all of the incoming vulnerability reports and determine that two or more vulnerability reports are for the same vulnerability and then determine which tester was first to report the vulnerability. This is a considerable undertaking for a large system under test and can sometimes be impractical. It is not a simple matter to do a word-by-word comparison of the vulnerability reports by multiple submitters, because not all testers would use the same language or words.

SUMMARY

A vulnerability database management system manages data records representing vulnerability reports submitted by testers. The vulnerability database management system might comprise an input memory for storing a candidate vulnerability report submitted by a tester, a search record generator that generates a candidate search record corresponding to the candidate vulnerability report, a vulnerability database for storing vulnerability report records and corresponding search records, wherein a vulnerability report record in the vulnerability database represents a previously accepted vulnerability report and wherein a corresponding search record represents a search record corresponding to the previously accepted vulnerability report, a search engine configured to receive the candidate search record and use the candidate search record as a search query against the corresponding search records stored in the vulnerability database, resulting in search results based on the candidate search record, and an intake management computer interface that, when a match between the candidate search record and the search results is below a threshold match tightness criteria, presents the search results to an operator and obtains operator feedback at least as to whether to accept the candidate vulnerability report into the vulnerability database.

The intake management computer interface might use different thresholds in addition to the threshold match tightness criteria, such as heightened threshold match tightness criteria that is used to identify candidate vulnerability reports that can be rejected or flagged as duplicates without requiring operator review and a lowered threshold match tightness criteria that is used to identify candidate vulnerability reports that can be added to the vulnerability database without requiring operator review. When the search results returned by the search engine is an empty set, that is also a case where the intake management computer might accept the candidate vulnerability report into the vulnerability database without requiring operator feedback.

Each matching record in the search results might be assigned a similarity score value to indicate a similarity between that matching record and the candidate search record, perhaps in a manner similar to textual and/or structured text search engines. The similarity score values might be compared to a threshold similarity score value to determine whether the candidate search record, and thus the candidate vulnerability record, should be added to the vulnerability database or rejected as being a duplicate of an existing vulnerability record. The search results might be sorted based on the similarity score values for the matching records of the search results. The search engine might use a hierarchical feeder network to provide meta-scoring for generating the similarity score values.

The vulnerability database might store the corresponding search records natively as the vulnerability reports. Alternatively, the vulnerability database might comprise distinct data structures for storing vulnerability records and corresponding search records. The corresponding search records might be tokenized versions of their corresponding vulnerability reports. The tokenized versions of the corresponding vulnerability reports might include token weights, wherein words on a noise words list are given lower weights than words not on the noise words list. A tokenized version of the corresponding vulnerability report might have representations of tokens where at least one representation of a token represents multiple distinct words that are synonyms of each other.

The search results might be provided via a JSONP-compliant application programming interface, wherein the vulnerability database comprises a file-system based data structure and/or an in-memory data structure. The vulnerability database management system might be configured with logic for dynamically configuration using a stored plurality of configurable parameters to be used by the intake management computer interface and the search engine.

A vulnerability report evaluation system comprises a preprocessor that takes as its input a data record representing a vulnerability report and outputs a search record. The vulnerability report evaluation system further comprises a search engine and a searchable corpus comprising records of vulnerabilities, wherein the search engine is configured to use the outputted search record to search the corpus. The vulnerability report evaluation system can flag search result hits resulting from the queried search record as an indication that the submitted vulnerability report is a duplicate of an earlier vulnerability report or as a flag to trigger manual review, while providing efficient processing of vulnerability report data records.

The following detailed description together with the accompanying drawings will provide a better understanding of the nature and advantages of the present invention.

BRIEF DESCRIPTION OF THE DRAWINGS

Various embodiments in accordance with the present disclosure will be described with reference to the drawings, in which:

FIG. 3 is a representation of a portion of a vulnerability database that might be evaluated in the process of FIG. 2.

Figure 1:
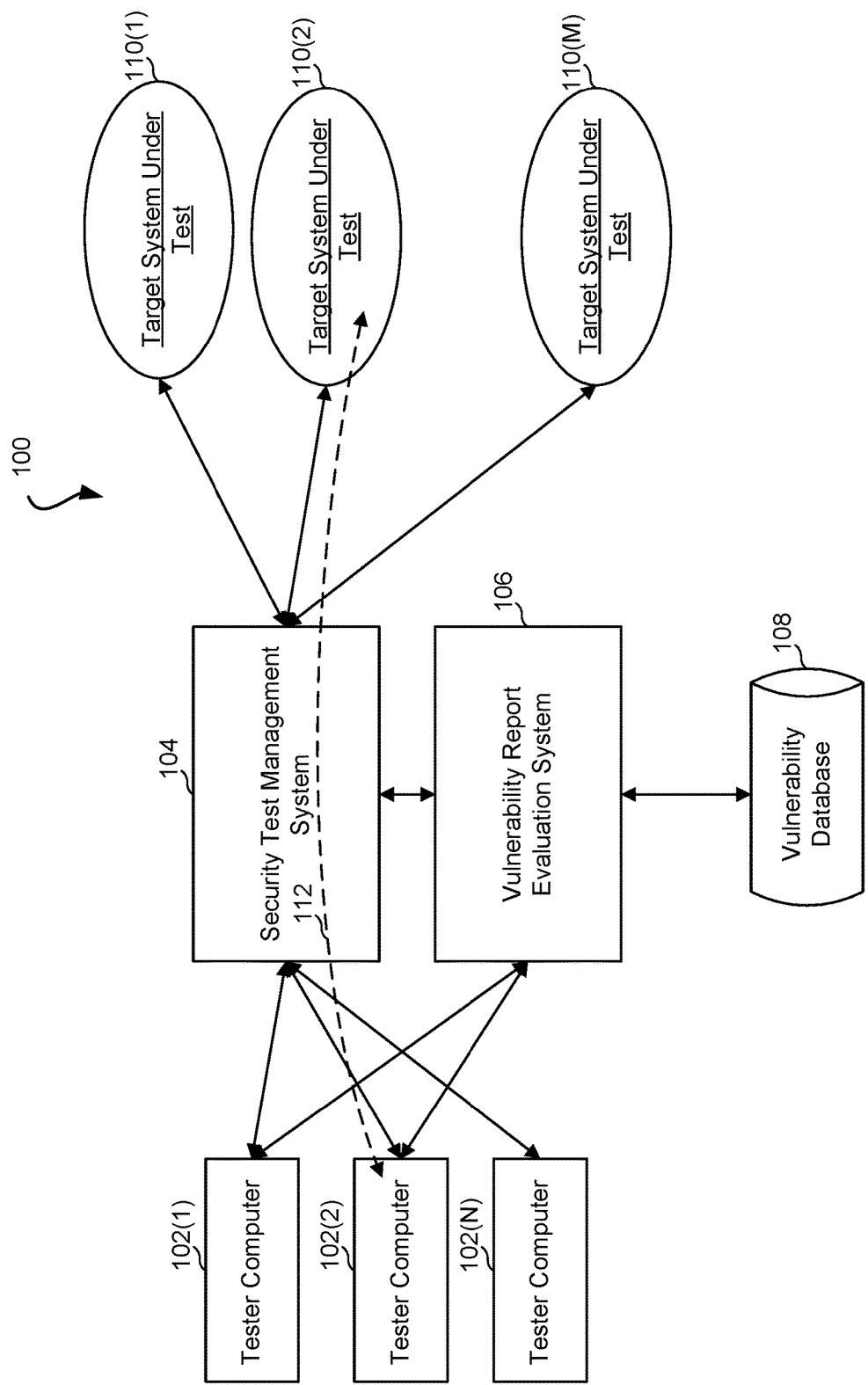
FIG. 1 illustrates an example security test management system arrangement that may be used for crowd-sourced vulnerability discovery and evaluating vulnerabilities for duplicates.

An Appendix is included herewith, comprising source code examples.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In many of the examples in this disclosure, a computer system being evaluated in a security test is software being executed by one or more processor and hardware comprising the one or more processor, associated memory, network connections, interfaces and the like. Such a computer system might comprise multiple elements, such as multiple computer servers, multiple database servers, network equipment that facilitates data communications between multiple elements and users of the computer system, multiple processors and program instruction storage devices that contain program code corresponding to one or more application programs (applications) that are executed by the computer system.

For simplicity in the explanations here, testers are people or other computer systems that test the computer system by interacting with an application that is executed by the computer system. The term "application" need not be limited to one monolithic program or a single purpose program, but generally refers to that which is being tested for possible security vulnerabilities. In an example security test, a tester selects a particular security test to perform, accesses the application through an available interface, performs some interaction with the application, and the response of the application can indicate whether the application passes or fails (or partially passes, partially fails) that security test.

Examples of available interfaces might be network interfaces, input/output interfaces, computer-to-computer interfaces, hardware interfaces or the like. The available interfaces might include interfaces that are expected to normally operate for the application or unexpected interfaces. In an extremely specific example, a tester is a security researcher familiar with common misconfigurations of database servers who executes commands on the tester's computer to access a maintenance interface of a database server under test with the access being over the Internet, sends certain messages to the maintenance interface and the maintenance interface responds with response messages containing sensitive information about the database server and/or its contents that is not information that the designers and/or managers of the database server under test intended to make available over that maintenance interface.

The application could include human-facing interfaces, such as a web server that receives requests from user browsers and responds with HTML pages. The application could also include machine-facing interfaces, such as an application program interface (API) that other programs can use to interact with the application. It is not required that the exact extent of what constitutes an application and its boundaries. Some applications may be amenable to granular division into parts that can be tested for security vulnerabilities. For example, a web application might have functionality for authenticating users (login screens, etc.), serving up static content to browsers on request, accepting user inputs to perform commands, and the like. Each of these might be tested for security separately.

When a tester discovers what they deem to be a vulnerability instance, the test will submit a vulnerability report using an interface provided for that purpose using the tester computer or another system. Testers can be computer security researchers, experts or others, working together or working independently. Where testers are working independently, possibly at different times in different places, they might discover the same vulnerability and thus duplicate vulnerability reports could be submitted. Thus it would be of interest to the managers of a testing service to identify duplicates for various reasons, such as ensuring that multiple testers are not credited with the same vulnerability discovery. This can be important where testers are compensated or recognized based on discovery of as-yet undiscovered vulnerabilities.

Vulnerabilities are represented as vulnerability records in a vulnerability database. The database can be a structured database, unstructured data, or other form, distributed or otherwise, such that it is able to document vulnerabilities. The vulnerability database might include only unique vulnerability reports, but might also contain duplicates, such as might be the case where the vulnerability database houses both the accepted unique vulnerabilities as well as other received vulnerability reports that have yet to be processed for duplicate checking.

Additional details for particular embodiments of security test management systems that facilitate distributed testing of target systems for security vulnerabilities by distributed testers and related methods of operation are described below with reference to the figures.

FIG. 1 illustrates a security test management system arrangement 100 that serves as a test hub with interfaces to testers' computers and interfaces to target systems under test. The test hub might itself be distributed. Data described as being stored by the test hub might be stored in database systems, data structures, file structures, etc., fully maintained by the test hub or in some cases stored under the control of a target system, such as when it is convenient to store test data about a target system with the target system. In some embodiments, the test hub is a launch point computer that handles all of the traffic between tester computers and the target system, as well as arrangements with testers such as a compensation system, chat system, and resource providing system. The test hub might thus be used for crowd-sourced web application vulnerability discovery, providing globally distributed network penetration testing, and determining incentives for promoting the discovery of vulnerabilities. The testers might be computer professionals with particular security skill sets.

As illustrated in FIG. 1, tester computers 102 (e.g., 102(1), 102(2), . . . , 102(N)) interface with a security test management system 104 (a test hub) so as to keep track of the various testers who (or that, in the case of non-human testers) are using security test management system 104 and their activities in testing target systems 110 (e.g., 110(1), 110(2), . . . , 110(M)). The security test management system 104 interfaces with a vulnerability report evaluation system 106 to pass it vulnerability reports generated by the testers, which are then stored in a vulnerability database 108.

In this illustration, there are multiple tester computers 102. It may be that there is one tester computer 102 per tester or testers share computers, but this detail is not necessary for full understanding of the system shown. The number of tester computers might be in the hundreds or thousands when crowdsourcing is being done to solve security problems. The number of target systems 110 under test need not be precisely specified and may vary from time to time.

A test session might comprise a sequence of interactions between a tester computer 102 under the control of a tester, such as a security researcher attempting to identify vulnerabilities in a specific target system or test for robustness, possibly in exchange for incentives offered to testers. One such session is illustrated by the dashed line 112 representing a test session wherein a tester using tester computer 102(2) is testing target system 110(2).

Because security test management system 104 is the interface between tester computers and target systems, security test management system 104 can monitor interactions, obfuscate interactions (such as to keep details of the target systems unknown to the testers for security of the target system, so that testing is a fair test of security, or for other reasons), and to facilitate replay of detected vulnerabilities for compensation operations, remediation operations, or other operations. The interconnections illustrated in FIG. 1 might be by network connections, such as Internet connections, LAN connections or other methods or means of electronically interacting.

In an embodiment, each tester computer 102 is associated with one of a plurality of distributed testers of the type previously described. Tester computers 102 may comprise desktop computers, workstations, laptop computers, netbook computers, ultrabook computers, tablet computers or smartphones. Tester computers 102 are coupled indirectly to security test management system 104 by any combination of one or more local area networks, wide area networks, internetworks and the like, which may include the public Internet.

Security test management system 104 may execute a separate process for each target system under test. In an embodiment, security test management system 104 acts as a terminal that is configured for the purposes of providing network connectivity and monitoring for communications between tester computers 102 and target systems 110. In addition to providing an interface to tester computers, the logical position of security test management system 104 between the tester computers and the target systems provides secure routing of tester communications to target systems and provides a predictable source IP address for the manager of the target systems. This allows the manager of the target system under test to limit access to certain elements of the target system to testers, such as by adjustment of firewalls and/or IPS/IDS devices.

Security test management system 104 may be configured to provide a particular tester computer with access to a particular target system only under specified circumstances including after assessment, testing, assignment of a project, or other operations. Thus, tester computers 102 typically cannot contact the target systems at will, but instead, security test management system 104 facilitates access, grants access or provides credentials. Testers typically cannot add vulnerabilities to vulnerability database 108 directly, so that vulnerability database 108 might be available for use by others on a read-only basis where those others only see unique vulnerabilities, due to the action of the vulnerability report evaluation system 106.

In an embodiment, data comprising a vulnerability report is received in the same view or user interface facility that is used to obtain data about projects, target computers and target networks. In an embodiment, to report a prospective vulnerability, the tester enters a category value and optionally a sub-category value for the vulnerability that they are reporting. The category and sub-category values are deemed proposed and are subject to validation by the service provider. In some embodiments, reporting a prospective vulnerability may comprise receiving data values in fields of a submission form.

As an example, a submission form may comprise data fields for Title, Description, Vulnerability Category (perhaps as a drop-down menu selection), text to indicate steps needed to reproduce the vulnerability, an indication of the impact of the vulnerability, recommended fixes, and perhaps a URL at which the vulnerability exists. The security test management system 104 provides the vulnerability reports to the vulnerability report evaluation system 106.

Figure 2:
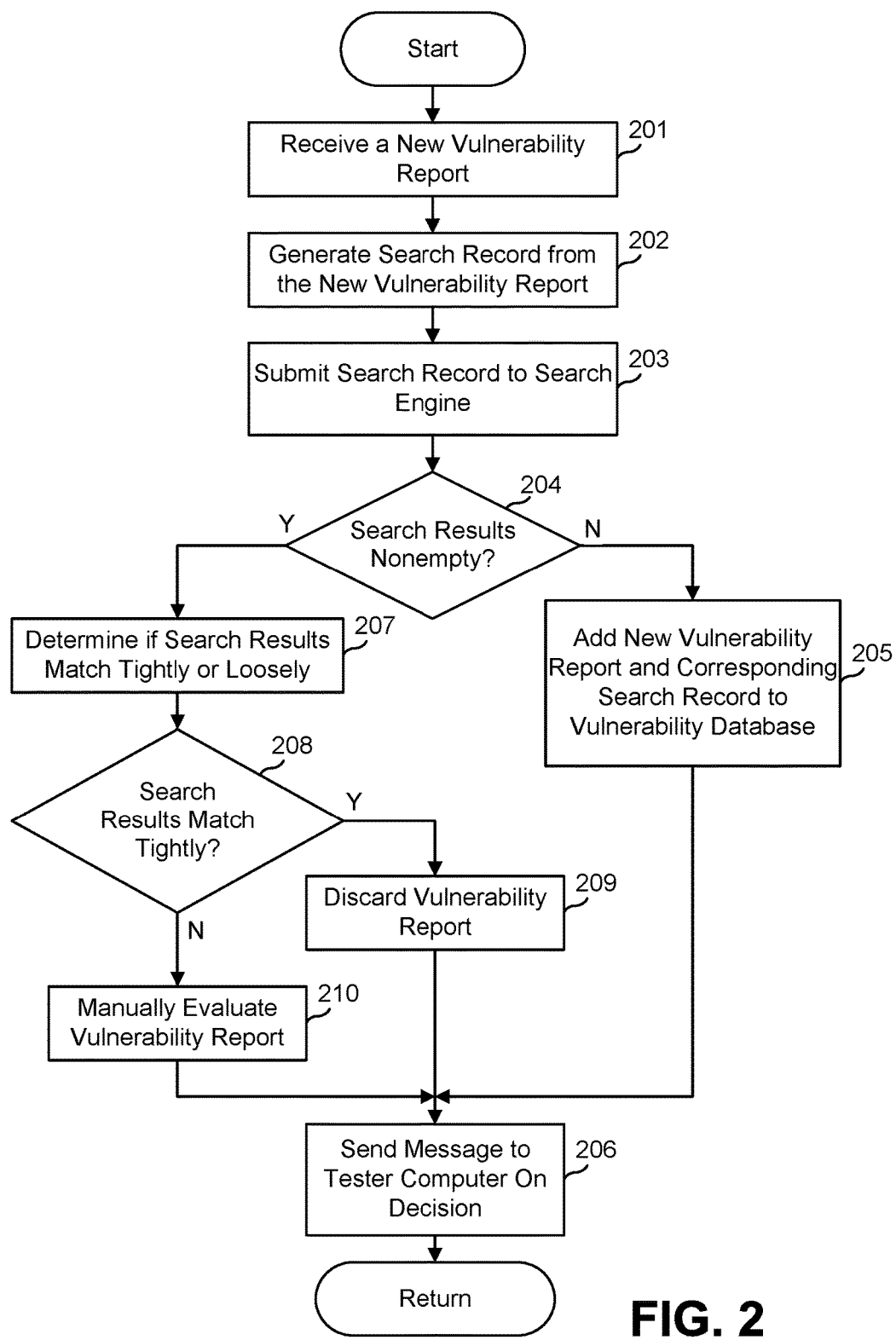
FIG. 2 is a flowchart of a vulnerability duplication evaluation process.

FIG. 2 is a flowchart of a vulnerability duplication evaluation process. This process might be executed by the vulnerability report evaluation system 106 each time a vulnerability report is received or when multiple candidate vulnerability reports are received. In step 201, a new vulnerability report is received. That report might be stored in an input memory. In step 202, as explained in more detail below, a candidate search record is generated from the candidate vulnerability report and, at step 203, the search record is submitted to the search engine. The search record might be generated by a search record generator that operates as a preprocessor separate from the search engine. If the search results come up empty (step 204), then the vulnerability report is added to the vulnerability database 108. Optionally, a message is sent to the tester computer that submitted the new vulnerability report (206) and the processing of that new vulnerability report is complete.

If, at step 204, the search results are not empty, the process determines (207) if the search results match the new vulnerability report tightly or loosely (208). If they tightly match, the process results in the new vulnerability report being discarded (209), and a message is sent to the tester computer that submitted the new vulnerability report indicating that the new vulnerability report is a duplicate. However, if the search results match the new vulnerability report loosely, the match is presented or stored (210) for manual review by a human reviewer, following which a message might be sent to the tester computer and the process completes.

FIG. 3 is a representation of a portion of a vulnerability database that might evaluated in the process of FIG. 2. As illustrated there, some reports might be duplicates (such as vulnerabilities #3 and #4) but are not identical. As explained above, it is often preferable that in an incentive-based vulnerability reporting system, only the first unique report be compensated.

Figure 4:
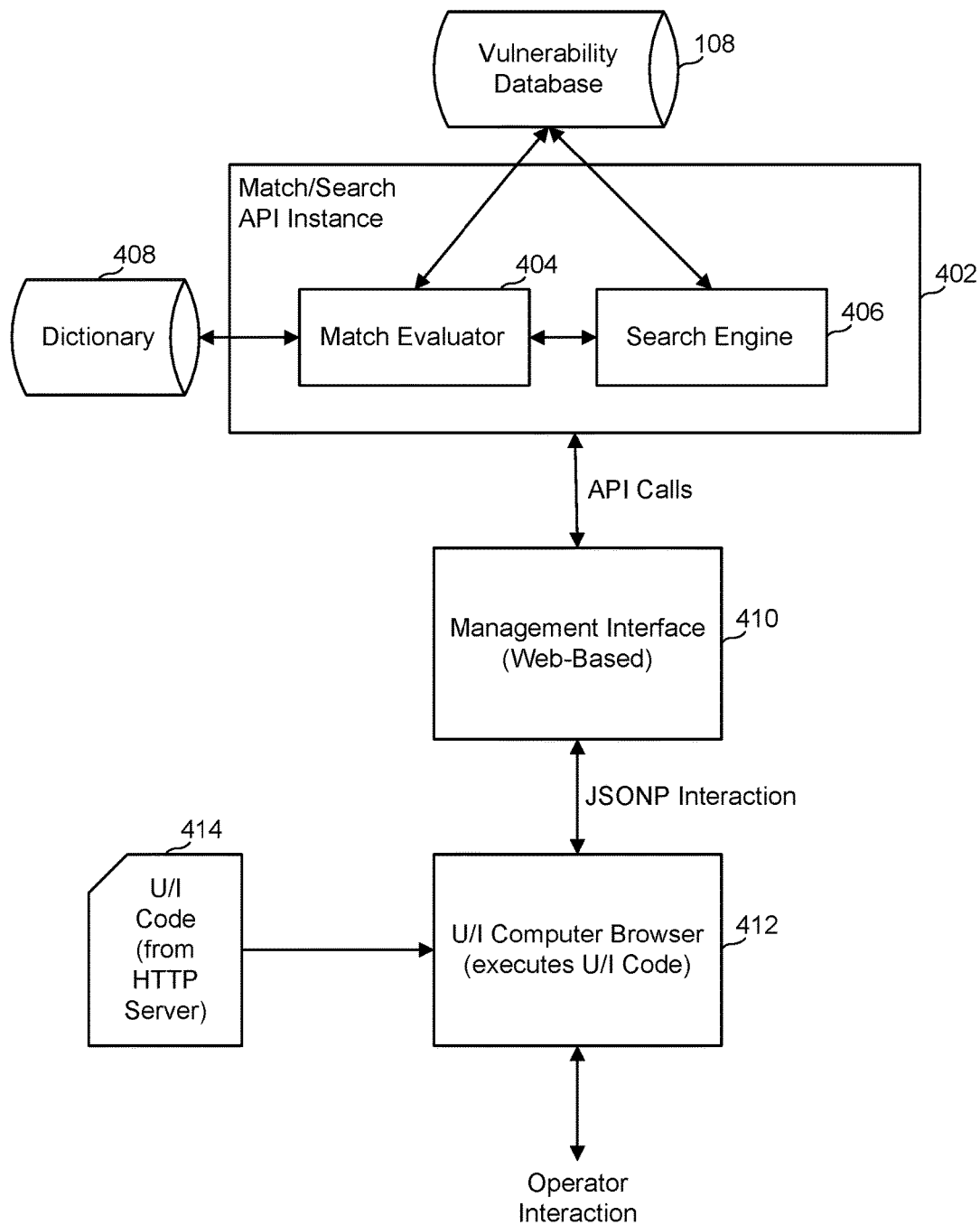
FIG. 4 is a block diagram of a search-and-match system that might be used to identify duplicates.

FIG. 4 is a block diagram of a search-and-match system that might be used to identify duplicates. As shown there, instance of a search-and-match API instance 402 can access the vulnerability database 108 and comprises a match evaluator 404 and a search engine 406. The match evaluator can access a dictionary database 408. The search-and-match API instance 402 is accessible to a management interface 410. In one example, management interface 410 is web-based and API calls are via HTTP or other protocol. A client system, such as a U/I computer browser 412 executes U/I code 414 obtained from an HTTP server. That HTTP server can be the same system as the management interface 410 or a distinct source. The U/I code 414 might interact with the management interface 410 using JSONP. An operator can interact with various systems using the U/I code 414 as described elsewhere herein.

In a typical operation, the operator might instruct the search-and-match API instance 402 to find instances of loosely matched vulnerability records. Once the operator indicates a selected candidate vulnerability record, a corresponding search record is generated (or, if already generated, is retrieved), and search engine 406 is run using that search record as a search query to find other vulnerability records, which the match evaluator 404 will assess and provide match scores for viewing by the operator. In this manner, identifying duplicates is converted to a search operation, which can thus benefit from existing technology available for performing searches over text and data corpuses. The operator can then provide operator feedback as to whether a viewed vulnerability report is a duplicate.

For the sake of operator efficiency, an intake management computer interface used by the operator to accept and decline candidate vulnerability records might use various thresholds. For example, if the search result is the empty set or the search results are all below a lowered threshold match tightness criteria, the candidate vulnerability report might be accepted without operator review. If any of the matching records in the search results is above a heightened threshold match tightness criteria, the candidate vulnerability report might be declined without operator review. The thresholds might correspond to similarity score values calculated as described herein.

Figure 5:
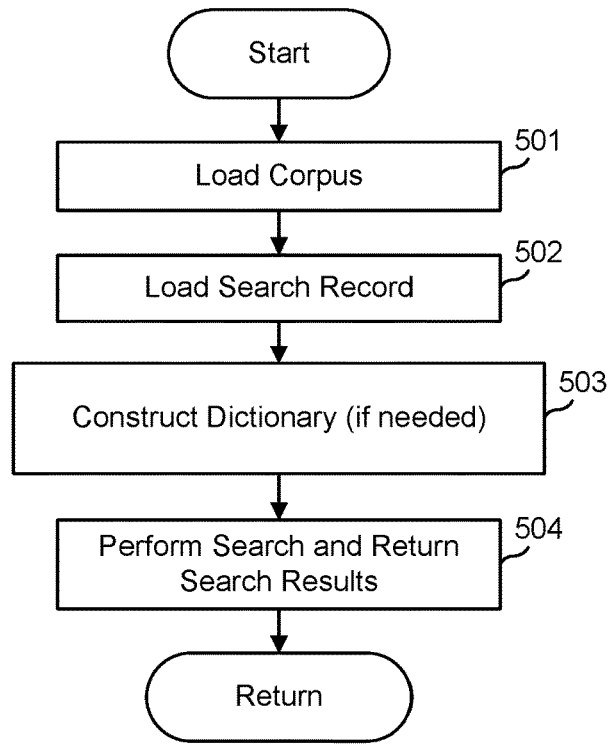
FIG. 5 is a flowchart of a search process in greater detail.

FIG. 5 is a flowchart of a search process in greater detail. This process might be run by the instance 402 or a separate process on the same or a separate machine. In a first step 501, the corpus is loaded or made accessible. This corpus can be the corresponding search records for the vulnerability records already deemed to be for unique vulnerabilities. At step 502, the search engine loads a search request. At step 503, the dictionary database 408 is constructed or accessed. At step 504, the search is performed and the search results are provided. The search results can be provided with scores and sorted and presented in scored order or other order.

A searchable corpus might be a vulnerability database that simply stores corresponding search records natively as the vulnerability reports. Alternatively, the vulnerability database might comprise distinct data structures for storing vulnerability records and corresponding search records. The search results might be provided via a JSONP-compliant application programming interface, wherein the vulnerability database comprises a file-system based data structure and/or an in-memory data structure. The vulnerability database management system might be configured with logic for dynamically configuration using a stored plurality of configurable parameters to be used by the intake management computer interface and the search engine.

The process and system for structuring a duplicate vulnerability determination as a search engine process will now be described in further detail. The search engine uses term frequency and inverse document frequency in its processing, treating each vulnerability record (and/or its corresponding search record) as a document in the corpus.

A preprocessor can take as its input a candidate vulnerability report and output a corresponding search record that can be used by a search engine to query against search records for corresponding vulnerability reports that are already accepted into the vulnerability database. When a candidate vulnerability record is being processed to create its corresponding search record, one of the initial preprocessing steps might be to tokenize it into unique terms. Tokenizing might include weighting tokens and overlaying synonyms so that multiple distinct words that are synonyms are represented by the same token. Noise words might be given very low weights.

Term Frequency (or "TF") can be represented by the number of times a term occurs within a given document. TF quantifies the occurrence of each of those terms or tokens within the set of documents of the corpus. TF can be defined as shown in Equation 1, wherein t refers to a term, d refers to a document, tf refers to term frequency, and f refers to a raw term frequency of term t in document d.

$$tf(t, D) = 0.5 + \left[ \frac{0.5 \cdot f(t, D)}{\max\{f(t, D) : t \in d\}} \right] \quad \text{(Eqn. 1)}$$

There could be a minimal bias towards longer documents when searching for a given term. Therefore, in Equation 1, the raw term frequency (f) is divided by the maximum term frequency (max(f)) and appropriate constants are added to minimize the longer document bias. To understand the existence of such a bias and the need to minimize it, consider that different terms can have different amounts of occurrence in a document. Thus, if the document is longer, then there is a likelihood that raw term frequency, on average, would increase. Thus, the size of document would impact raw term frequency. To mitigate such a bias, a double normalization technique is introduced with a leading constant term of 0.5. This tends to factor out the impact of document size on the raw term frequency, which would make it more independent of document size.

Inverse Document Frequency (or "IDF") can correspond to the amount of information a term provides. In particular, it can measure the commonness or rareness of a term across all the documents. Equation 2 provides a representation of IDF, wherein t refers to a term, d refers to a document, D refers to the set of all documents d, idf refers to inverse document frequency, and N refers to the number of documents.

$$idf(t, D) = \log\left[\frac{N}{|\{d \in D : t \in d\}|}\right] \quad \text{(Eqn. 2)}$$

The value of idf(t,D) corresponds to the fraction of the documents that contain the term t. In particular, this is the total number of documents, N, divided by the number of documents that contain the term t. As the number of terms approach zero, the value of IDF approaches infinity. To avoid this issue, a correction is applied wherein the new denominator adds a constant 1.0 to the existing denominator. The ratio of numerator and denominator is logarithmically scaled to ensure that smaller steps can describe larger shifts in document-wide terms' presences and terms' absences are significantly penalized.

A Ranking Function can be a function belonging to the TF-IDF family of functions (i.e., a function resulting from the product of TF and IDF metrics). This ranking function can be used in computing a score that can be used to rank a set of documents based on their match-closeness to the input query. In our case, the input query corresponds to the candidate vulnerability report. To account for the score's variability, normalization is used, which ensures that the ranking score remains in the interval [0.0, 1.0]. A score closer to one indicates that a tight match has been found, while a score approaching zero signifies that an approximate match (a loosely matched record) is available. These families of TF-IDF based ranking functions are sometimes known as Best Matching (or BM) functions. Their generalized mathematical description is given by Equation 3, wherein Q is the set of queries, D is the set of documents, q is the query i, f is the term frequency, $k_1$ is a free parameter that belongs to the interval [0.0, 2.0], b is a free parameter that belongs to the interval [0.0, 1.0], $D_{avg}$ is the average length in the set of documents, $\delta$ is a free parameter that is equal to either 0.0 or 1.0, n is the number of queries, and IDF is the inverse document frequency.

$$score(D, Q) = \sum_{i=1}^{n} IDF(q_i, D) \cdot \left[\frac{f(q_i, D) \cdot (k_1 + 1)}{f(q_i, D) + k_1 \cdot \left\{1 - b + b \cdot \left(\frac{|D|}{D_{avg}}\right)\right\}} + \delta\right] \quad \text{(Eqn. 3)}$$

For different values of the various free parameters, the search engine can operate differently, deriving a variety of BM ranking functions. Example BM ranking functions include those known as BM11 (for $k_1=1.5$, $b=1.0$, and $\delta=0$), BM15 (for $k_1=1.5$, $b=0.0$, and $\delta=0$), BM25 (for $k_1=1.5$, $b=0.75$, and $\delta=0$), and BM25+(for $k_1=1.5$, $b=0.75$, and $\delta=1$).

Dictionary construction might proceed using the BuildDictionary( ) procedure set forth in Appendix A, Section 1. This procedure might be executed by any suitable processor referenced herein. The construction of dictionary can use file storage and/or in-memory based records. Herein, records and documents might be used in certain contexts interchangeably. The time complexity for BuildDictionary( ) procedure is on the order of the size of the corpus.

The document-wide TF-IDF values might be generated using the GenerateDocTFIDFValues( ) procedure set forth in Appendix A, Section 2. This procedure might be executed by any suitable processor referenced herein. This procedure is responsible for computing TF-IDF values for each term over all the vulnerability records. Additionally, it also helps compute useful metrics, such as the number of records in the corpus and average record length over the entire set of records stored. The time complexity for GenerateDocTFIDFValues( ) procedure is O(|Corpus|×|BagOfWords|).

The term-wide TF-IDF values might be generated using the GenerateTermTFIDFValues( ) procedure set forth in Appendix A, Section 3. This procedure might be executed by any suitable processor referenced herein. This procedure computes TF-IDF values for each term within a record. In particular, for each term, the TF-IDF score is a 2-tuple of the form <$Term_i$, $TermTF_i \times TermIDF_i$>. Consequently, the output of this procedure is a list of such 2-tuples for each term in a record. The time complexity for GenerateTermTFIDFValue( ) procedure is O(|DocTF|).

The BM Ranking Function based scores might be generated using the ComputeBMScore( ) procedure set forth in Appendix A, Section 4. This procedure might be executed by any suitable processor referenced herein. This procedure computes similarity scores for the candidate vulnerability record (the record being tested for whether it is a duplicate or not) by comparing the search records of the candidate vulnerability record with pre-stored vulnerability records in the corpus. The aforementioned ranking function can be used to help compute these scores. The output of this procedure is a list of similarity scores. Each such score in that list results from a comparison between the input new vulnerability and pre-stored vulnerability record from the corpus. This procedure can dynamically modify itself in order to behave as any one of the BM11, BM15, BM25, or BM25+ ranking functions. The time complexity for ComputeBMScore( ) procedure is O(|DocTF|×|CommonTerms|).

Figure 6:
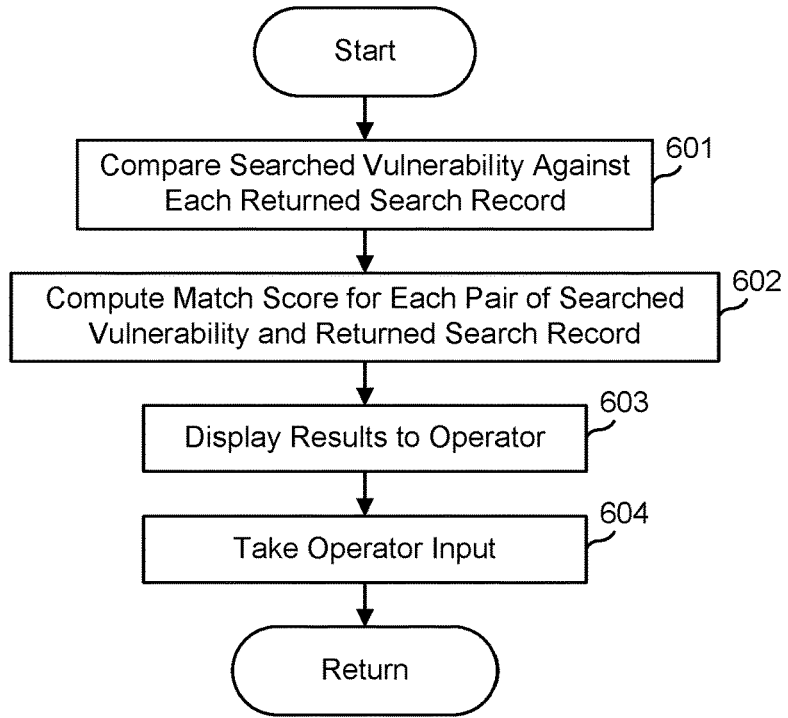
FIG. 6 is a flowchart of a match and scoring process in greater detail.

FIG. 6 is a flowchart of a match and scoring process in greater detail. At step 601, the candidate vulnerability is compared against each returned search result. At step 602, the match score is computed for each pair, which can then be displayed to the operator (603) or stored and then further operator input (604) can be obtained.

The match selection might be done using the FullyFormedClosestMatchSelector( ) procedure set forth in Appendix A, Section 5. This procedure might be executed by any suitable processor referenced herein. This procedure generates the closest pre-stored vulnerability record from the corpus for a given input vulnerability record. It also provides the similarity score for the input vulnerability record. Furthermore, it constructs and returns a sorted list of a predefined number of most closely matching pre-stored vulnerability records from the corpus for a given input vulnerability record. An entry in this list is a 2-tuple of type <Score$_{1...k}$, 1 ... k>, where k is the pre-defined number of most closely matches solicited. The time complexity for FullyFormedClosestMatchSelector( ) procedure is O(|Corpus|×|ScoreList|).

In some embodiments, the tokenized terms of a search record are used for the search process and in other embodiments, the search query includes attributes that may or may not correspond to text of a vulnerability report. Tokenizing a vulnerability report into a search record might also include canonicalization, such as by treating similar words with different endings as being the same attribute.

By utilizing the aforementioned procedures, the system can provide a list of most closely matching vulnerability records, along with their similarity scores from the pre-stored corpus for any given set of new vulnerability reports.

In a specific example vulnerability report evaluation system, the aforementioned processes and interfaces are combined. The system can operate on a corpus of vulnerabilities to determine if a vulnerability in question is actually a duplicate of another vulnerability in the database. This can automate, or partially automate, the process of vulnerability de-duplication. In operation, testers submit vulnerabilities to be added to the database. An operator mediates the vulnerability approval process by evaluating loosely matched vulnerabilities, whereas tightly matched duplicates can be dismissed automatically. The vulnerabilities database might be implemented as a PostgreSQL or another standard SQL-based database server. Communication can be established via a standard SQL driver protocol.

An interface server for use by the operator might be an HTTP server that supports simple JSONP requests as set forth in Appendix A, Section 6. The user interface allows the operator to see the server status prior to initiating a search operation, and might include a search box to enable searching for specific vulnerability IDs, and the number of potential matches desired.

According to one embodiment, the techniques described herein are implemented by one or generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

Figure 7:
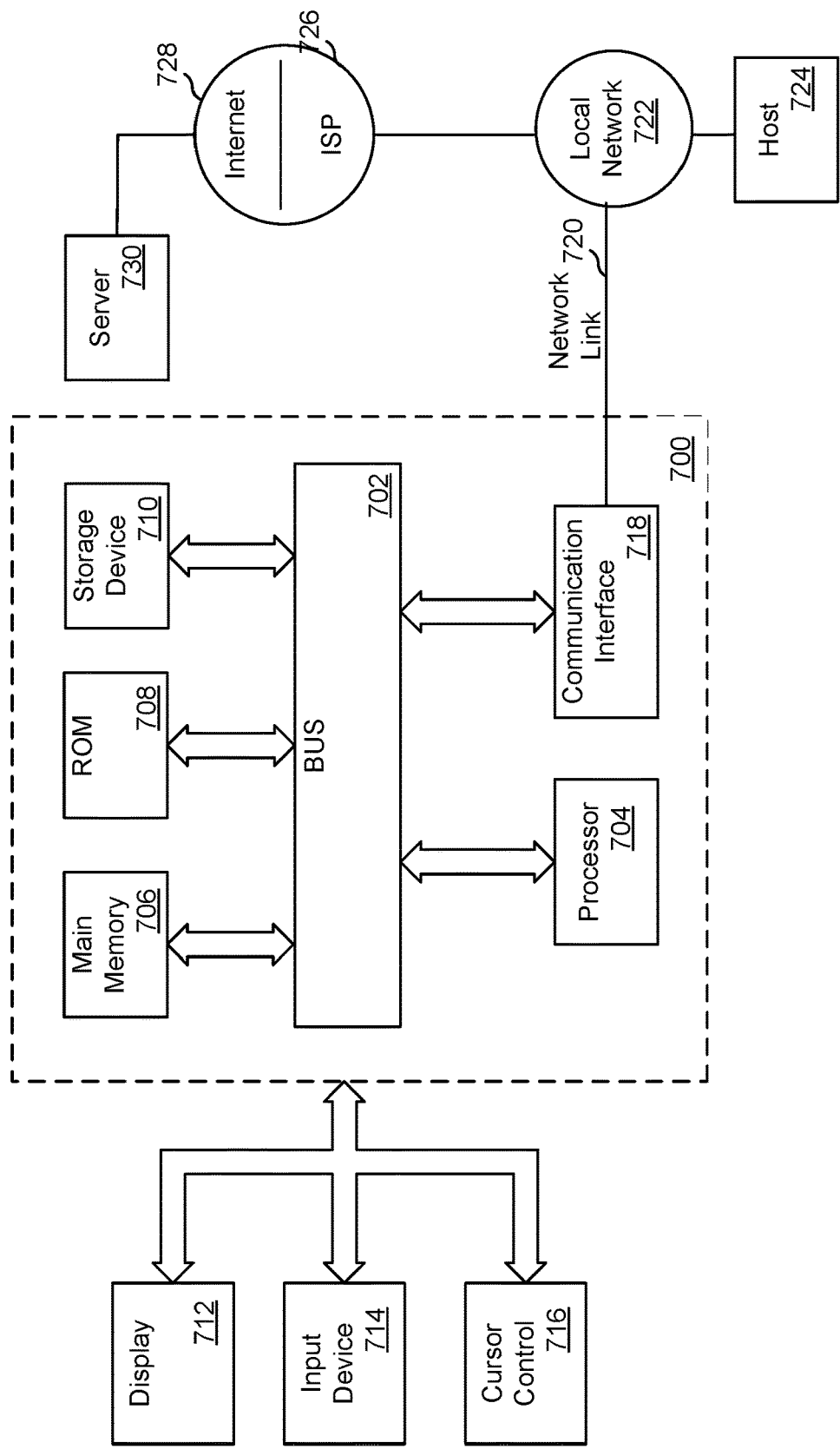
FIG. 7 is a block diagram that illustrates a computer system upon which an embodiment of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. The received code may be executed by processor 704 as it is received, and/or stored in storage device 710, or other non-volatile storage for later execution.

As described herein, a vulnerability report evaluation system might comprise a preprocessor that takes as its input a data record representing a vulnerability report and outputs a search record. The vulnerability report evaluation system further comprises a search engine and a searchable corpus comprising records of vulnerabilities, wherein the search engine is configured to use the outputted search record to search the corpus. The vulnerability report evaluation system can flag search result hits resulting from the searched search record as an indication that the submitted vulnerability report is a duplicate of an earlier vulnerability report or as a flag to trigger manual review, while providing efficient processing of vulnerability report data records.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

APPENDIX A

Source Code Examples

Section 1: BuildDictionary( ) Process
   1.  InputCorpus = EMPTY_LIST
   2.  for each record R in the current file or in-memory source:
   2.1.  InputCorpus.Append(R)
   3.  Dictionary.Add(InputCorpus)
Section 2: GenerateDocTFIDFValues( ) Process
   1.  TotalDocLen = 0
   2.  for each record R in the current file or in-memory source:
   2.1.  CurrDoc = R
   2.2.  TotalDocLen = TotalDocLen + Length(CurrDoc)
   2.3.  DocLength.Append(Length(CurrDoc))
   2.4.  BagOfWords = Dictionary(<$Term_i$, (CurrFreq × Length(CurrDoc))>)
   2.5.  for each $Term_i$ and TermFreq in BagOfWords.ItemList:

APPENDIX A-continued

Source Code Examples

```
        2.5.1.    if Term_i not in DocFreq:
        2.5.1.1.      DocFreq[Term_i] = 0
        2.6.    DocFreq[Term_i] = DocFreq[Term_i] + 1
        2.7.    DocTermFreq.Append(BagOfWords)
        2.8.    NumOfDocs = NumOfDocs + 1
    3.  for each Term_i in DocFreq:
        3.1.    DocIDF[Term_i] = Log_e(NumOfDocs − DocFreq[Term_i] +
                  0.5) / (DocFreq[Term_i] + 0.5)
    4.  DocAvgLen = TotalDocLen / NumOfDocs
Section 3: GenerateTermTFIDFValues( ) Process
    1.  TermTFIDFList = EMPTY_LIST
    2.  for each document D in DocTF:
        2.1.    DocTFIDF = <Term_i, TermFreq × DocIDF[Term_i]> for
                  each D
    3.  DocTFIDF.Sort( )
    4.  TermTFIDFList.Append(DocTFIDF)
    5.  return TermTFIDFList
Section 4: ComputeBMScore( ) Process
    1.  ScoreList = EMPTY_LIST
    2.  InputQueryBagOfWords =
          Dictionary.DocToBagOfWords(NewVulnRecord)
    3.  for each Doc_i, CurrDoc in DocTF:
        3.1.    CommonTerms =
                  Set(Dictionary(InputQueryBagOfWords) .Keys( )) &
                  Set(CurrDoc.Keys( ))
        3.2.    TmpScoreList = EMPTY_LIST
        3.3.    DocTermsLen = DocLen[Doc_i]
        3.4.    for each Term_i in CommonTerms:
            3.4.1.    ScoreFuncNum = (CurrDoc[Term_i] × (k_1 + 1))
            3.4.2.    ScoreFuncDen = ((CurrDoc[Term_i] + k_1 × (1 − b +
                        (b × DocTermsLen / DocAvgLen)))
            3.4.3.    if (AlgIdentifier == ALGO_BM25P):
            3.4.3.1.      TmpScoreList.Append(DocIDF[Term_i] ×
                            ((ScoreFuncNum / ScoreFuncDen) + 1))
            3.4.4.    else:
            3.4.4.1.      TmpScoreList.Append(DocIDF[Term_i] ×
                            ((ScoreFuncNum / ScoreFuncDen))
        3.5.    ScoreList.Append(Sum(TmpScoreList))
    4.  return ScoreList
Section 5: FullyFormedClosestMatchSelector( ) Process
    1.  CurrLineNum = 1
    2.  FinalResult = EMPTY_LIST
    3.  StatusEqual = True
    4.  for each record R in the current file or in-memory source:
        4.1.    if (AlgIdentifier == ALGO_BM11):
        4.1.1.      k_1 = 1.5, b = 1.0, δ = 0.0
        4.2.    elif (AlgIdentifier == ALGO_BM15):
        4.2.1.      k_1 = 1.5, b = 0.0, δ = 0.0
        4.3.    elif (AlgIdentifier == ALGO_BM25):
        4.3.1.      k_1 = 1.5, b = 0.75, δ = 0.0
        4.4.    else:
        4.4.1.      k_1 = 1.5, b = 0.75, δ = 1.0
        4.5.    ScoreList = ComputeBMScore(InputVulnRecord,
                  AlgIdentifier, k_1, b)
        4.6.    for each Score_i, ScoreValue in ScoreList:
        4.6.1.      if (ScoreValue != 0):
        4.6.1.1.        StatusEqual = False
        4.7.    if (StatusEqual):
        4.7.1.      FinalResult = Φ
        4.7.2.      return FinalResult
        4.8.    ScoreList.Sort( )
        4.9.    for each Curr_i in range(0, NumOfClosestMatches):
        4.9.1.      ComputeMaxMin(ScoreList)
        4.9.2.      if ((MaxValue − MinValue) > 0.0):
        4.9.2.1.        DiffMaxMin = (MaxValue − MinValue)
        4.9.2.2.        FinalResult.Append((ScoreList[Curr_i][0],
                          ((ScoreList[Curr_i][1] − MinValue) / DiffMaxMin)))
        4.9.3.      else:
        4.9.3.1.        DiffMaxMin = ((MaxValue − MinValue) + 1.0)
        4.9.3.2.        FinalResult.Append((ScoreList[Curr_i][0],
                          ((ScoreList[Curr_i][1] − MinValue) + 1.0) /
                          DiffMaxMin)))
    5.  CurrLineNum = CurrLineNum + 1
        5.1.    return FinalResult
Section 6: HTTP Server That Supports Simple JSONP Requests
    1.  HTTP Request:
    2.  /twinseeker/api/v1.0/info?callback=[callback function]
    3.  HTTP Response:
    4.      {"msg": "OK",              // Response message
    5.      "code": 200,               // Response code
    6.      "data": {                  // Response data
    7.      status: "Ready",           // Server status
    8.      age: 13610.589457035065,   // Age of dictionary
    9.      version: "0.0.1b",         // API version
    10.     max_id: 6553......         // Highest vulnid in the database
    11.     }}
    12. HTTP Request:
    13. /twinseeker/api/v1.0/duplicates?callback=[callback
          function]&max_matches=[Max number of matches to
          return]&vulnid=[Query duplicates for vulnid]
    14. HTTP Response:
    15.     {"msg": "OK",              // Response message
    16.     "code": 200,               // Response code
    17.     "data": {                  // Response data
    18.     "queried": 33,             // Which vuln was
                                          queried
    19.     "matches": [{              // List of duplicates
    20.     "duplicate": null,         // Already marked
                                          duplicate?
    21.     "score": "0.454520",       // Match score
    22.     "listing": 7060,           // Match belongs
                                          to listing
    23.     "codename": "TARGETNAME",  // Name of target
    24.     "accepted": true,          // Was submission
                                          accepted?
    25.     "id": 63}],                // ID of vulnerability
    26.     "dedup_ms": 167,           // Time spent in
                                          algorithm
    27.     "db_ms": 9                 // Time spent in
              Database                    SQL
    28.     }}
```

What is claimed is:

1. A vulnerability database management system for managing data records representing vulnerability reports submitted by testers, the vulnerability database management system comprising:

an input memory for storing a candidate vulnerability report submitted by a tester;

a search record generator including a processor that generates a candidate search record by tokenizing the candidate vulnerability report;

a vulnerability database for storing vulnerability report records and corresponding search records, wherein a vulnerability report record in the vulnerability database represents a previously accepted vulnerability report and wherein a corresponding search record represents a search record corresponding to the previously accepted vulnerability report;

a search engine configured to receive the candidate search record and use the candidate search record as a search query against the corresponding search records stored in the vulnerability database, resulting in search results based on the candidate search record; and an intake management computer interface that, when a match between the candidate search record and the search results is below a threshold match tightness criteria, presents the search results to an operator and obtains operator feedback at least as to whether to accept the candidate vulnerability report into the vulnerability database and, when the match between the candidate search record and the search results is not below the threshold match tightness criteria, designates the candidate vulnerability report as a duplicate candidate vulnerability report.

2. The vulnerability database management system of claim 1, wherein the intake management computer is further configured to decline to accept the candidate vulnerability report into the vulnerability database without requiring operator feedback when the match between the candidate search record and the search results is above a heightened threshold match tightness criteria.

3. The vulnerability database management system of claim 1, wherein the intake management computer is further configured to accept the candidate vulnerability report into the vulnerability database without requiring operator feedback when the match between the candidate search record and the search results is below a lowered threshold match tightness criteria.

4. The vulnerability database management system of claim 1, wherein the intake management computer is further configured to accept the candidate vulnerability report into the vulnerability database without requiring operator feedback when the search results returned by the search engine is an empty set.

5. The vulnerability database management system of claim 1, wherein the search results are sorted according to similarity score values and the threshold match tightness criteria comprises a threshold similarity score value.

6. The vulnerability database management system of claim 5, wherein the search engine is configured to use a hierarchical feeder network to provide meta-scoring for generating the similarity score values.

7. The vulnerability database management system of claim 1, wherein the corresponding search records are natively the vulnerability reports stored in the vulnerability database.

8. The vulnerability database management system of claim 1, wherein the vulnerability database comprises a first data structure for vulnerability records and a second data structure, distinct from the first data structure, for the corresponding search records.

9. The vulnerability database management system of claim 1, wherein the corresponding search record is a tokenized version of its corresponding vulnerability report.

10. The vulnerability database management system of claim 9, wherein the tokenized version of the corresponding vulnerability report includes token weights, wherein words on a noise words list are given lower weights than words not on the noise words list.

11. The vulnerability database management system of claim 9, wherein the tokenized version of the corresponding vulnerability report has representations of tokens and at least one representation of a token represents multiple distinct words that are synonyms of each other.

12. The vulnerability database management system of claim 1, wherein the search results are provided via a JSONP-compliant application programming interface.

13. The vulnerability database management system of claim 1, wherein the vulnerability database comprises a file-system based data structure.

14. The vulnerability database management system of claim 1, wherein the vulnerability database comprises an in-memory data structure.

15. The vulnerability database management system of claim 1, wherein the search engine is configured to use a hierarchical feeder network to provide meta-scoring for generating similarity score values.

16. The vulnerability database management system of claim 1, further comprising logic for dynamically configuration using a stored plurality of configurable parameters to be used by the intake management computer interface and the search engine.

17. A method for evaluating duplication of vulnerability reports stored in a vulnerability database, the vulnerability database comprising vulnerability report records and corresponding search records, wherein a vulnerability report record in the vulnerability database represents a previously accepted vulnerability report and wherein a corresponding search record represents a search record corresponding to the previously accepted vulnerability report, the method comprising:
  receiving a candidate vulnerability report submitted by a tester;
  storing the candidate vulnerability report in an input memory;
  generating a candidate search record by tokenizing the candidate vulnerability report;
  submitting the candidate search record to a search engine configured to use the candidate search record as a search query against the corresponding search records stored in the vulnerability database, resulting in search results based on the candidate search record;
  determining whether a match between the candidate search record and the search results is below a threshold match tightness criteria;
  presenting the search results to an operator when the match is below the threshold and obtaining operator feedback at least as to whether to accept the candidate vulnerability report into the vulnerability database; and
  designating the candidate vulnerability report as a duplicate vulnerability report when the match is not below the threshold.

18. The method for evaluating duplication of vulnerability reports of claim 17, wherein generating the candidate search record by processing the candidate vulnerability report comprises tokenizing the candidate vulnerability report.

19. One or more non-transitory computer-readable storage media having collectively stored thereon executable instructions that, as a result of execution by one or more processors of a computer system, cause the computer system to at least:
  receive a candidate vulnerability report submitted by a tester;
  store the candidate vulnerability report in an input memory;
  generate a candidate search record by tokenizing the candidate vulnerability report;
  submit the candidate search record to a search engine configured to use the candidate search record as a search query to a vulnerability database, the vulnerability database comprising vulnerability report records and corresponding search records, wherein a vulnerability report record in the vulnerability database represents a previously accepted vulnerability report and wherein a corresponding search record represents a search record corresponding to the previously accepted vulnerability report, the search engine further configured to use the candidate search record as a search query against the corresponding search records stored in the vulnerability database, resulting in search results based on the candidate search record;
  determine whether a match between the candidate search record and the search results is below a threshold match tightness criteria;
  present the search results to an operator when the match is below the threshold and obtain operator feedback at least as to whether to accept the candidate vulnerability report into the vulnerability database; and designate the candidate vulnerability report as a duplicate vulnerability report when the match is not below the threshold.

\* \* \* \* \*